United States Patent [19]

Forrest et al.

[11] 3,881,118

[45] Apr. 29, 1975

[54] ELECTRONIC SWITCHING CIRCUITS

[75] Inventors: Robert Henry Forrest, Farnborough; Reginald John Kingston Splatt, Farnham, both of England

[73] Assignee: National Research Development Corporation, London, England

[22] Filed: Aug. 17, 1973

[21] Appl. No.: 389,160

[30] Foreign Application Priority Data

Aug. 25, 1972 United Kingdom............... 39694/72

[52] U.S. Cl. ... 307/252 UA; 307/252 B; 307/252 N; 307/311
[51] Int. Cl. ......................... H03k 17/60; H01v 3/00
[58] Field of Search........... 328/81, 208; 307/252 B, 307/252 N, 311 UA

[56] References Cited
UNITED STATES PATENTS

| | | | |
|---|---|---|---|
| 3,381,226 | 4/1968 | Jones et al. ..................... | 307/252 B |
| 3,723,769 | 3/1973 | Collins .......................... | 307/252 B |

OTHER PUBLICATIONS

*Electronic World*, Light–Emitting Doides, 1/68, by D. Heiserman, pp. 36, 37 and 67.

*Primary Examiner*—Stanley D. Miller, Jr.
*Assistant Examiner*—B. P. Davis
*Attorney, Agent, or Firm*—Cushman, Darby & Cushman

[57] ABSTRACT

Apparatus for use as a switch in series with an alternating current supply, including a bi-directional rectifier combination (for example a pair of thyristors); a bridge rectifier circuit; two resistors each of which is connected between a separate one of the input terminals of the bridge rectifier circuit and a separate one of the main terminals of the bi-directional rectifier combination; at least one electrical connection from an input terminal of the bridge rectifier circuit to a trigger electrode of the bi-directional rectifier combination; and, a control circuit of controllable conductivity connected across the output terminals of the bridge rectifier circuit. The switching circuits described close only when the supply voltage is zero and open only when the supply current is zero. An application of the circuits is described in which a conventional electro-mechanical switch and one such electronic switching circuit are connected in parallel, and their switching operations are controlled by a suitable control circuit to provide the transient-free load-switching characteristic of the electronic switching circuit as well as the low voltage loss characteristic of the electro-mechanical switch under steady state conditions.

6 Claims, 6 Drawing Figures

ELECTRONIC SWITCHING CIRCUITS

The present invention relates to electronic switching circuits, which may be used for instance for remote control or switching of alternating power supplies, or for analogous purposes.

The invention comprises a circuit for use as a switch in series with an alternating current supply, which includes a bi-directional rectifier combination, a bridge rectifier circuit, two resistors connecting the input terminals of the bridge rectifier circuit to the main terminals of the bi-directional rectifier combination, at least one connection from an input terminal of the bridge rectifier circuit to a trigger electrode of the bi-directional rectifier combination, and a control circuit of controllable conductivity connected across output connections of the bridge rectifier circuit. The bi-directional rectifier combination may be a triac, having only one trigger electrode which is connected to one input terminal of the bridge rectifier circuit. Alternatively, the bi-directional rectifier combination may be a pair of thyristors connected in parallel with opposite polarities. In this case, each thyristor will have a trigger electrode connected to a separate one of the input terminals of the bridge rectifier circuit, and each of the said resistors should preferably have a diode connected in parallel with it.

The control circuit must include a first transistor or a control thyristor having its collector to emitter current path connected across the output connections of the bridge rectifier circuit, and a second transistor having its base connected to receive from the output terminals of the bridge rectifier circuit a full-wave rectified waveform, possibly clipped, but still having spikes corresponding to zero-voltage points of the supply waveform, and control means for enabling the second transistor to draw current from a source of direct voltage not greater than the peak voltage of the waveform applied to its base, wherein the said first transistor or control thyristor is connected to conduct whenever the said second transistor conducts.

The circuit may also include a rectifier circuit, and a resistor and a Zener diode connected in series across the output of the rectifier circuit, and the control means may comprise means for applying the voltage developed across the Zener diode to the said second transistor. This may be achieved through an opto-electronic isolator. This rectifier circuit may be a voltage-multiplying circuit having input connections connected in parallel with the bi-directional rectifier combination.

Embodiments of the invention will now be described, by way of example only, with reference to the accompanying drawings, of which.

Figure 1:
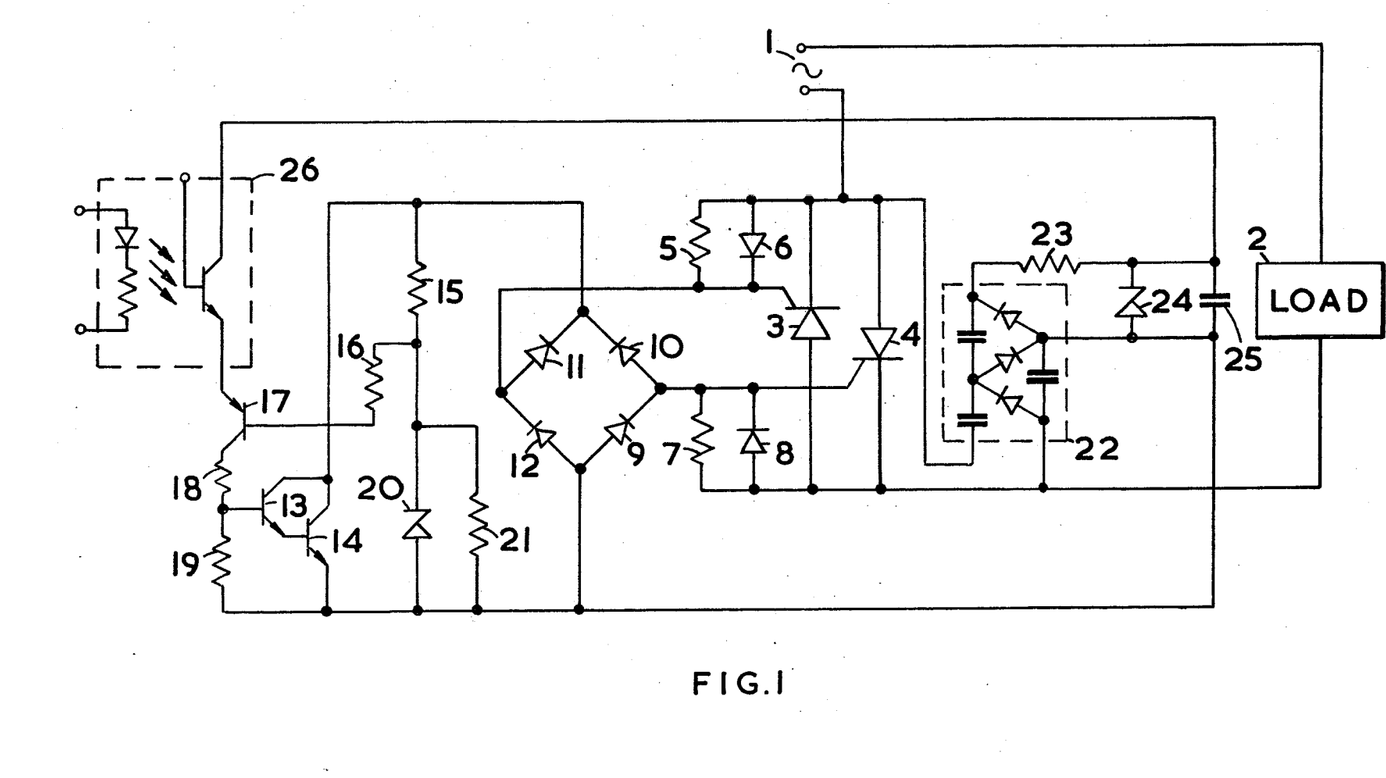
FIG. 1 is a circuit diagram of a switching circuit.

FIG. 1 shows details of a circuit for controlling the supply of power from an alternating current supply 1 to a load 2. The switching circuit is connected in series with the load 2. It includes two thyristors 3 and 4, which are connected in parallel with opposite polarities. A resistor 5 and a diode 6 are connected in parallel between the cathode and the trigger electrode of the thyristor 3. Similarly a resistor 7 and a diode 8 are connected in parallel between the trigger electrode and the cathode of the thyristor 4. A bridge rectifier circuit formed of diodes 9, 10, 11 and 12 has input terminals connected between the trigger electrode of the thyristor 3 and the trigger electrode of the thyristor 4. Two high-voltage transistor 13 and 14, connected as a super-alpha pair, are connected in parallel with the output terminals of the bridge rectifier circuit. Resistors 15 and 16 in series connect the collectors of the transistors 13 and 14 to the base of another transistor 17. The collector of the transistor 17 is connected by a resistor 18 to the base of the transistor 13. The base of the transistor 13 is connected by a resistor 19 to the emitter of the transistor 14. A Zener diode 20 is connected between the junction of resistors 15 and 16 and the emitter of the transistor 14. A resistor 21 is connected in parallel with the Zener diode 20.

A voltage-multiplying rectifier circuit 22 has input connections connected in parallel with the thyristors 3 and 4, and output connections feeding a Zener diode 24 through a resistor 23. A capacitor 25 is connected in parallel with the Zener diode 24. One side of the Zener diode 24 is connected to the emitter of the transistor 14; the other side of the Zener diode 24 is connected to the emitter of the transistor 17 through an opto-electronic isolator device 26.

Figure 2:
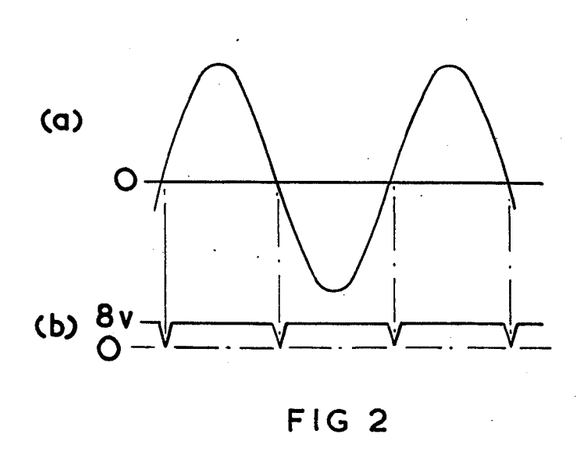
FIG. 2 is a graphical diagram of waveforms associated with the circuit of FIG. 1.

When there is no control input to the isolator device 26 it has a high impedance. The transistors 17, 13 and 14 are therefore nonconductive, and the bridge circuit of diodes 9 to 12 has a comparatively high impedance. It therefore draws very little current through the resistors 5 and 7, and the voltage drop across these resistors is insufficient to trigger the thyristors 3 and 4. The thyristors 3 and 4 are therefore non-conductive, and a greater part of the alternating supply voltage is therefore developed across the thyristor, and applied to the rectifier circuit 22 and also to the bridge rectifier circuit comprising diodes 9 to 12. Curve A in FIG. 2 represents the alternating supply voltage. The output of the bridge rectifier circuit comprises rectified half sine waves which are clipped to a maximum voltage of about 8 volts by the action of the Zener diode 20. The curve B in FIG. 2 therefore represents the waveform developed across the Zener diode 20 and applied to the base of the transistor 17. The rectifier circuit 22 also develops a steady voltage of about 8 volts across the Zener diode 24.

Figure 3:
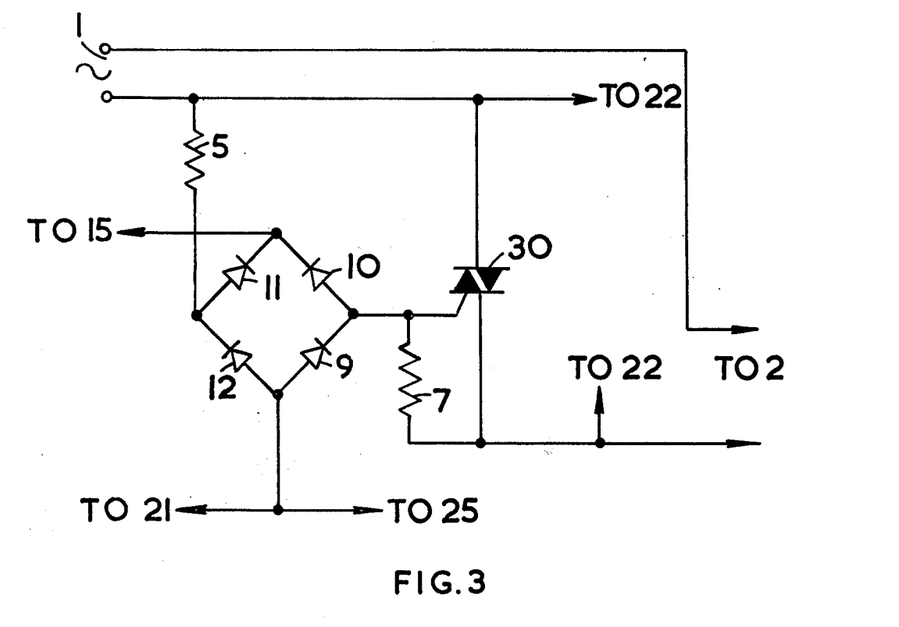
FIG. 3 is a circuit diagram showing a modification of part of the circuit of FIG. 1.

When a control input is applied to the isolator device 26, it becomes conductive, applying the voltage of about 8 volts from the Zener diode 24 to the emitter of the transistor 17; but this has no effect until the next negative-going spike of the waveform B is applied to the base of the transistor 17. This occurs at the next zero-crossing of the supply voltage waveform. The transistor 17 then conducts, causing the transistors 13 and 14 to conduct, thus placing a low impedance across the bridge circuit. The bridge circuit therefore begins to draw appreciable current through one of the diodes 6 or 8 and through the opposite resistor 5 or 7, depending on the polarity of the supply voltage at the time. The voltage drop across the resistor involved becomes sufficient to trigger the appropriate one of the thyristors 3 or 4. One of the thyristors is therefore triggered immediately after the zero-crossing of the supply voltage waveform. The voltage across the thyristor therefore falls, and in consequence the voltage applied to the emitter and base of the transistor 17 fall considerably; however the voltage-multiplying rectifier circuit 22 is arranged to maintain a sufficient voltage on the emitter of the transistor 17 to keep it conductive as long as the isolator device 26 remains conductive. When the current drawn by the load through the conductive thyristor drops to zero, that thyristor will become non-conductive, but there will be a sufficient trigger voltage to cause the other thyristor to start conducting. Hence the load 2 draws current through the thyristors 3 and 4 alternately, as long as the control input to the isolator device 26 is maintained. When the control input is removed from the isolator 26, the transistors 17, 13 and 14 become non-conductive. The bridge rectifier circuit therefore draws less current, the trigger voltages cease to be developed, and the thyristors are both made non-conductive at the next current zero. Thus the circuit ensures that the thyristors will be triggered only at a voltage zero crossing of the supply waveform, and will be extinguished at current zeros of the supply current. FIG. 3 shows a modification, in which a triac 30 replaces the thyristors 3 and 4. In this case, there is only one trigger connection and the diodes 6 and 8 are omitted. Both forms of the circuit are insensitive to the frequency of the supply voltage, and can be readily adapted for use with various triacs or thyristors by a suitable choice of component valves.

Figure 4:
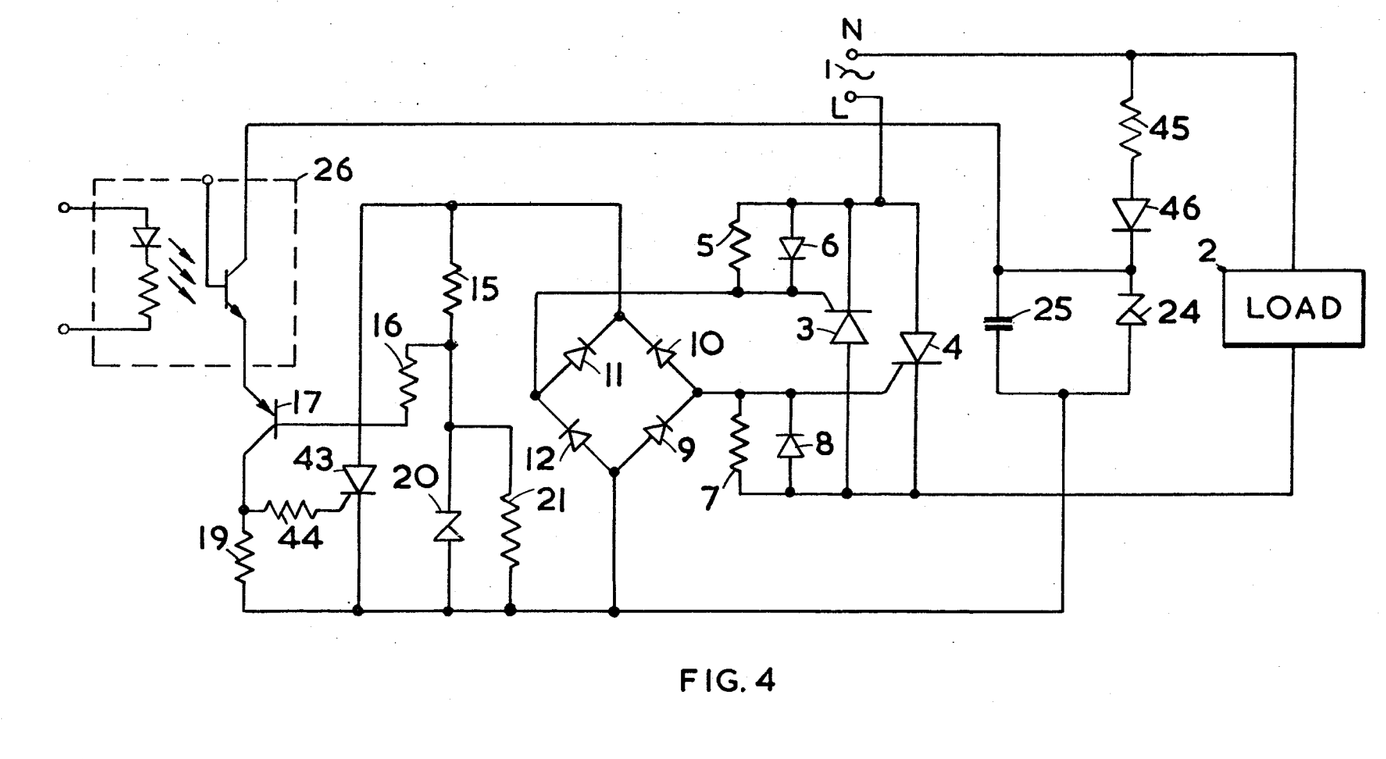
FIG. 4 is a circuit diagram of an alternative form of the switching circuit.

FIG. 4 shows an alternative form of the circuit, in which a thyristor 43 replaces the transistors 13 and 14. The resistor 18 of FIG. 1 is replaced by a direct connection but the trigger of the thyristor 43 is connected to the collector of the transistor 17 through a resistor 44. To provide a higher voltage for triggering the thyristor 43 when the isolator 26 is conductive, the rectifier circuit 22 of FIG. 1 is replaced by a simpler circuit comprising a diode 46 and a resistor 45 connected in series between the Zener diode 24 and the negative line of the a.c. mains supply 1. This simpler form of rectifier circuit could also be used in the circuit of FIG. 1. The use of the control thyristor 43 is desirable where a high-voltage main supply is to be used, as a high voltage rating is more readily available in thyristors than in transistors. The modification of FIG. 3 may also be applied to the circuit of FIG. 4.

One application of the electronic switching circuits described hereinabove will now be described by way of example only and with reference to FIG. 5 and FIG. 6 of the accompanying drawings which show alternative forms, as schematic circuit diagrams, of alternating current load-switching apparatus.

Because of the low voltage drop associated with them, electro-mechanical switches are used in many industrial applications to switch on and switch off alternating current loads. The switching operations of such switches are generally accompanied by large amplitude transient voltage and current surges. These transient conditions can be damaging to the switch contacts which are consequently made more substantial and robust than they otherwise would need to be in an effort to reduce the frequency with which they must be replaced. The contacts are therefore usually larger and as a result the electro-mechanical switch may be physically much larger than would be necessary in order to cope with the steady-state voltage and current load running conditions.

Various methods have been proposed, see for example *New Electronics*, Sept. 15, 1970 at page 61, and devices marketed, for example, the Zerac produced by Findley Irvine Ltd, By Road, Peniciuhn, Edinburgh, in an attempt to reduce these transient voltages and currents. Triacs, or other active semi-conductor devices, have been used to reduce the transient conditions associated with the operation of an electro-mechanical switch to switch off the load, and capacitance-resistance circuits have been used to reduce the transient conditions associated with the operation of an electro-mechanical switch to switch on the load. Success has been limited.

Figure 5:
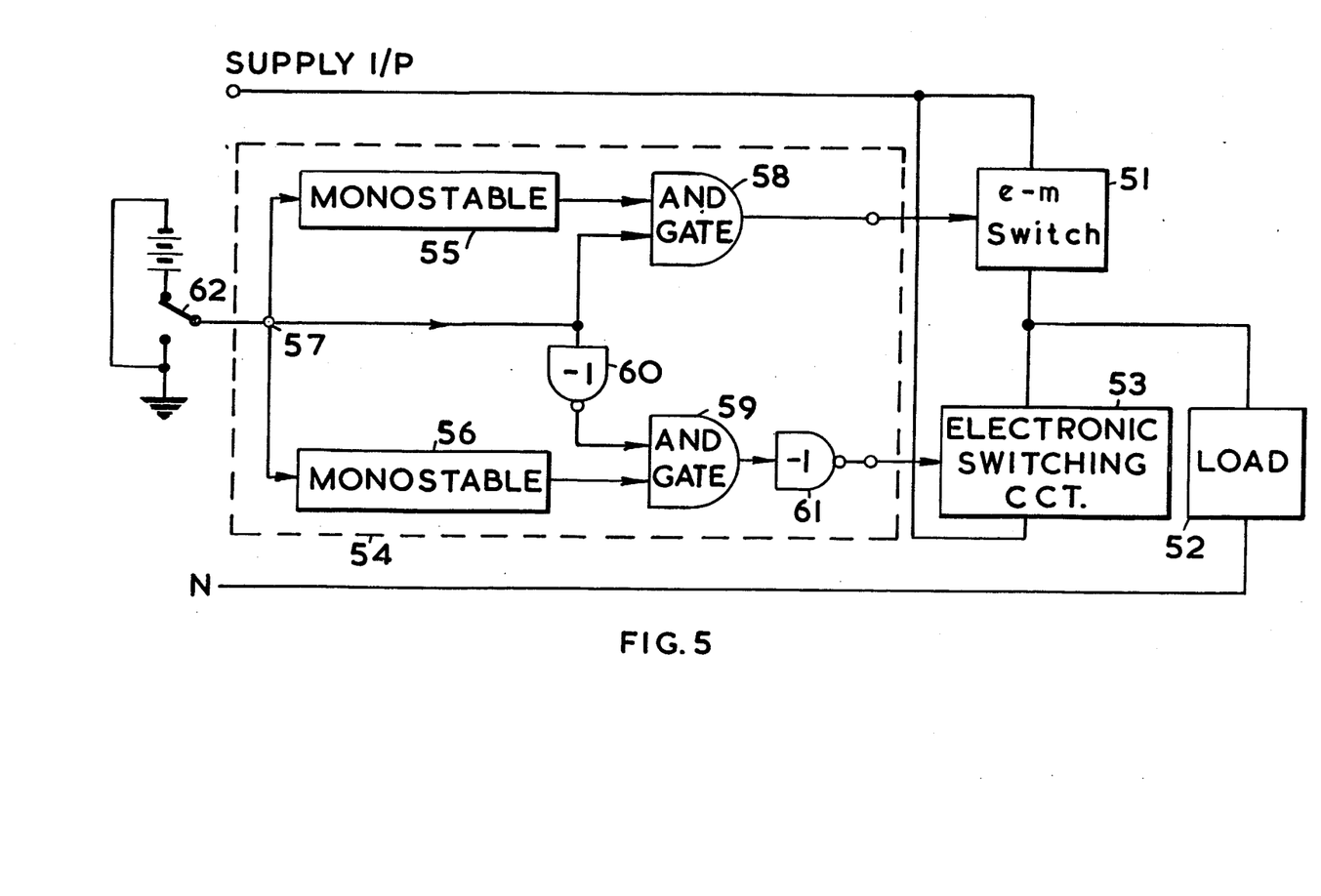
FIG. 5 is a schematic circuit diagram illustrating an application of the switching circuits described hereinabove and FIG. 6 is a schematic circuit diagram illustrating an alternative form of the application shown in FIG. 5.
Figure 6:
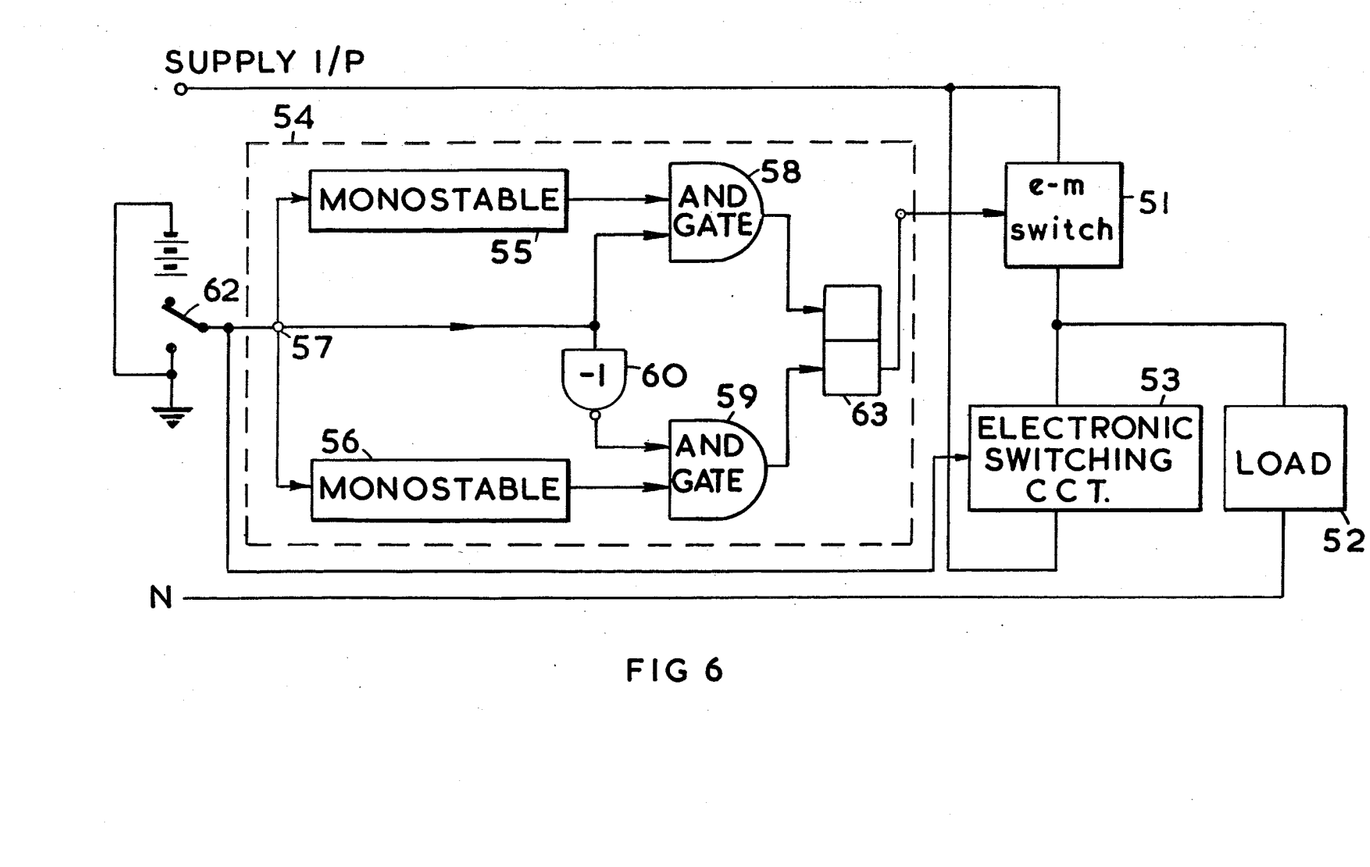

FIGS. 5 and 6 show an arrangement in which an electronic switching circuit of the type described hereinabove is connected in parallel with an electromechanical switch between a supply of electrical alternating current and a load. In both cases a logic control circuit is provided to ensure that when switching on, the electronic switching circuit closes before the electro-mechanical switch, and when switching off the electronic switching circuit does not open until after the electro-magnetic switch is fully opened. It will be appreciated that this arrangement takes advantage of the zero-voltage closing and zero-current opening of the electronic switching circuit and the low voltage drop under steady-state running conditions of the electro-mechanical switch. By suitable design of the logic control circuit it can be arranged that the electronic switching circuit only has to carry at the most a half cycle of the alternating current supply in each operation before the electro-mechanical switch closes or after the electro-mechanical switch opens. Such a design requires a knowledge of the opening and closing times of the electro-mechanical switch and the frequency of the alternating current supply. One type of logic control circuit will be required if the opening and closing times of the electro-mechanical switch is long compared with a half-cycle at the frequency of the alternating current supply and another type of logic control circuit is required if those times are short compared with a half-cycle at that frequency. FIG. 5 shows a schematic circuit diagram suitable for applications where the electro-magnetic switch closing time is short compared with a half-cycle of the alternating current supply and FIG. 6 shows a schematic circuit diagram suitable for applications where the electro-mechanical switch closing time is long compared with a half-cycle at the supply frequency. Where elements in FIGS. 5 and 6 are common they have been given common reference numbers.

In FIG. 5 an electro-mechanical switch 51 is connected to control a single phase of the supply of electrical alternating voltage from a single or multiphase generator (not shown) to a load 52. Connected to the generator (not shown) and the load 52 in parallel with the electro-mechanical switch 51 is an electronic switching circuit 53 for example of the type shown in FIG. 1 or FIG. 4. The switching operations of the switches 51 and 53 are controlled by a logic control circuit 54, the elements of which are responsive to direct current voltage signals of either a first magnitude and polarity, referred to hereinafter as a one-signal, or a second magnitude and polarity, referred to hereinafter as a zero-signal. The control circuit 54 comprises a first delay circuit 55 and a second delay circuit 56 each having an input connected to a control signal input 57. The output of the first delay circuit 55 is connected to one input of a first gate circuit 58 and the output of the second delay circuit is connected to one input of a second gate circuit 59. The gate circuits 58 and 59 each have a further input connected to the control signal input 57, that to the gate circuit 59 being via an inverting circuit 60. The gate circuit 58 has an output connected to a control input of the electro-mechanical switch 51 and the gate circuit 59 has an output connected to the control input of the electronic switching circuit 53 via an inverting circuit 61.

Each of the delay circuits 55 and 56 comprises a monostable circuit. The signal on the output of the monostable circuit 55 in its stable state is a one-signal. The monostable circuit 55 is triggered into its unstable state, that is to say the signal at its output changes from a one-signal to a zero-signal, whenever the signal at its input changes from a zero-signal to a one-signal and it remains in its unstable state for a first predetermined time $t_1$. At the end of this predetermined time the monostable circuit 55 reverts to its stable state, that is to say the signal at its output changes from a zero-signal to a one-signal again.

The signal at the output of the monostable circuit 56 in its stable state is a one-signal. The monostable circuit 56 is triggered into its unstable state whenever the signal at its input changes from a one-signal to a zero-signal and it remains in its unstable state for a second predetermined time $t_2$. At the end of this predetermined time the momostable circuit 56 reverts to its stable state, that is to say the signal at its output changes from a zero-signal to a one-signal again. The gate circuits 58 and 59 are AND-gates. They produce a one-signal at their outputs when, and only when, one-signals are applied to both of their inputs simultaneously. The output of the gate circuit 59 is connected to the electronic switching circuit 53 via an inverting circuit 61. A one-signal at the output of the gate circuit 58 causes the electro-mechanical switch 51 to close, after its known closing time elapses, and to complete the electrical path between the generator (not shown) and the load 52. A one-signal at the output of the inverting circuit 61 causes the electronic switching circuit 53 to close whenever the voltage of the alternating supply is next zero and this also completes the electrical path between the generator (not shown) and the load 52.

A zero-signal at the output of the gate circuit 58 causes the electro-mechanical switch 51 to open, after its known opening time elapses, breaking the said electrical path. A zero-signal at the output of the inverting circuit 61 cauese the electronic switching circuit 53 to open whenever the current of the alternating supply is next zero and this also breaks the said electrical path.

A manually operated on/off switch 62 is connected to the control signal input 57. In one position the switch 62 applies a zero-signal to the control signal input 57 and in its other position the switch 62 applies a one-signal by means for example of a direct current voltage supply to the control signal input 57.

In operation with the on/off switch 62 connected to apply a zero-signal to the control signal input 57 both the switch 51 and 53 are switches off and no supply is connected to the load 52. However, when the on/off switch 62 is set to apply a one-signal to the control signal input 57 a one-signal is immediately applied to the enabling input of the gate circuit 58 and a zero-signal is applied to the enabling input of the gate circuit 59. The signal at the output of the gate circuit 59 immediately becomes a zero-signal and thus the output of the inverting circuit 61 simultaneously becomes a one-signal and the electronic switching circuit 53 is then switched on when the supply voltage makes its next zero-crossing so that the supply from the generator (not shown) is applied across the load 52. The change of signal from a zero-signal to a one-signal at the control signal input 57 causes the monostable circuit 55 to produce a zero-signal at its output for a predetermined time $t_1$. The signal at the output of the gate circuit 58 therefore remains a zero-signal and the electromechanical switch 51 remains switched off until the predetermined time $t_1$ has elapsed. After the time $t_1$ the signal at the output of the monostable circuit 55 becomes a one-signal once more and the gate circuit 58 is enabled and a one-signal is produced at its output which closes the electro-mechanical switch 51. Because the supply is initially made to the load 52 by means of the electronic switching circuit 53 which operates as hereinabove described to switch on when the voltage applied to it is zero, the load 52 does not cause any transient high voltages and currents to be generated in the circuit. When the electro-mechanical switch 51 is connected to supply the load 52, the load 52 is already being supplied via the electronic switching circuit 53 and therefore no transients occur. However, when the electro-mechanical switch 51 is in circuit the load 52 is connected to the supply via the low resistance path that the electro-mechanical switch 51 offers.

Sometime later the on/off switch 62 is operated to apply a zero-signal to the control signal input 57 again. The gate circuit 58 is immediately disabled and the electro-mechanical switch 51 is switched off and the load is now connected to the supply via the electronic switch 53 only. The change of signal at the control signal input 57 from a one-signal to a zero-signal causes the signal at the output of the monostable circuit 56 to change from a one-signal to a zero-signal for a predetermined time $t_2$ after which time it reverts to a one-signal again. Thus only after the time $t_2$ will both the inputs to the gate circuit 59 be one-signals whence the signal at its output will become a one-signal and the signal at the output of the inverting circuit 61 will become a zero-signal. Hence after a time $t_2$ from the application of a switch off signal from the switch 62 the electronic switch circuit 53 is switched off when the supply current reaches zero. In this way the supply to the load 52 is only broken when the current is zero as described hereinabove with respect to the electronic switching circuits.

In the example described with respect to FIG. 5 the closing time of the electro-mechanical switch 51 will be typically 17 milliseconds and its opening time will be typically 25 milliseconds. The frequency of the supply might be 50 hertz, that is to say one cycle at the supply frequency has a period of 20 milliseconds. The delays provided by the monostable circuits 55 and 56 must be such that the electronic switching circuit 53 is closed before the electro-mechanical switch 51 and opened after the electro-mechanical switch 51. The delays provided by the monostable circuits 55 and 56 are also preferably chosen so that on switch-on or switch-off the electronic switching circuit 53 only has to carry a half cycle or at the most one cycle of the supply current. Since the period $t_1$ will be added to the 17 milliseconds closing time of the electro-mechanical switch 51, $t_1$ should not be greater than about 3 milliseconds. The period $t_2$ should be greater than 25 milliseconds but less than 45 milliseconds to give the electro-mechanical switch 51 time to open before the electronic switching circuit 53 and further to provide that the electronic switching circuit 53 does not carry current for longer than one cycle of the supply.

If the supply frequency is 400 hertz and the same electro-mechanical switch 51, with an opening time of 25 milliseconds and a closing time of 17 milliseconds, is to be used, clearly with the delays suggested for the monostable circuits 55 and 56 the electronic switching circuit 53 would be required to carry far more than one cycle of the supply frequency when opening or closing signals are applied to the control circuit. A different form of logic control circuit is required in this case and an example of this is shown in FIG. 6. In FIG. 6 the electro-mechanical switch 51 is again connected to control a single phase of the supply of electrical alternating voltage from a single or multi-phase generator (not shown) to a load 52 and the electronic switching circuit 53 is again connected in parallel with it. The switching operations of the electronic switching circuit 53 are controlled by the logic circuit 54 as before although that circuit is modified as will be described later but the electro-mechanical switch 51 is controlled directly by the on/off switch 62. The logic control circuit 54 comprises a monostable circuit 55 and a monostable circuit 56 each having an input connected to a control signal input 57. The control signal input 57 is also directly connected to the control input of the electro-mechanical switch 51. The output of the monostable circuit 55 is connected to one input of an AND-gate 58 and the output of the monostable circuit 56 is connected to one input of an AND-gate 59. The control signal input 57 is also directly connected to another input of the AND-gate 58 and via an inverting circuit 60 to another input of the AND-gate 59. The outputs of the AND-gates 58 and 59 are connected to separate inputs of a bistable circuit 63 one output of which is connected to the control input of the electronic switching circuit 53. The bistable circuit 63 is connected such that a one-signal applied to it from the gate 58 causes the signal on its output to close the electronic switching circuit 53 and a one-signal applied to it from the gate 59 causes the signal on its output to open the electronic switching circuit 53. In operation with the on/off switch 62 connected to apply a zero-signal to the control signal input 57 both the switch 51 and the switch 53 are switched off and no supply is connected to the load 52. However, when the on/off switch 62 is set to apply a one-signal to the control input 57 a one-signal is immediately applied to the control input of the electro-mechanical switch 51 which will therefore close approximately 17 milliseconds later. The change of signal from a zero-signal to a one-signal at the control signal input 57 causes the signal at the output of the monostable circuit 55 to change from a one-signal to a zero-signal for a predetermined time $t_3$ after which time the gate 58 is enabled and applies a one-signal to the bistable circuit 63. Hence the electronic switching circuit 53 is not switched on until $t_3$ seconds after the application of the switch on signal to the control signal input 57. The monostable circuit 55 is chosen such that this time $t_3$ is less than 17 milliseconds by a time which represents at the most one cycle at the supply frequency 400 hertz. Hence the electronic switching circuit 53 is switched on before the electro-mechanical switch 51 but is not required to carry more than one cycle of the supply before that event occurs. Similarly, sometime later when the on/off switch 62 is operated to apply a zero-signal to the control signal input 57 again, the signal at the output of the monostable circuit 56 changes from a one-signal to a zero-signal for a time period $t_4$ after which time the gate circuit 59 is enabled and the electronic switch 53 is switched off via the bistable circuit 63. The zero-signal is however immediately applied to the electro-mechanical switch 51 which thus opens approximately 25 milliseconds thereafter. $t_4$ is therefore chosen to be longer than 25 milliseconds by a short time which represents not more than one cycle of the supply frequency so that the electronic switching circuit 53 is not opened until after the electro-mechanical switch 51 has been opened and further that it does not have to carry more than one cycle of the supply before it is opened.

Many modifications and alterations to the embodiments described with reference to FIGS. 5 and 6 will now become apparent to those skilled in the art. The actual gates and monostables and bistables used in the control circuit for example and their configuration therein will depend to a large extent on the type of logig (positive or negative) that is chosen. It is also only necessary to ensure that the electronic switching circuit 53 does not carry more than one cycle of the supply frequency if it is desired to use such electronic switching circuit without a heat sink. Clearly if a large heat sink can be tolerated then it is only necessary to ensure that the electronic switching circuit closes before and opens after the electro-mechanical switch 51, the actual times before and after not being of importance. If the control circuit is designed such that the electronic switching circuit 53 only carries the load current for half a cycle of the supply voltage waveform then a heat sink is not required and the thyristors used in the switching circuit can be considerably smaller than they would have been if they were required to carry the full load current continuously. Similarly, the size of the main contacts of the main electro-mechanical switch 51 can also be smaller than they would have been since they are only required to carry the full load current and not carry any transiently higher currents. The overall size and weight of the combination switch may thus be comparable with and certainly not significantly greater than that of a single electro-mechanical switch. Because of the zero-voltage and zero-current switch on/switch off properties of the electronic switching circuit the life of the combination switch should be considerably longer than that of the electro-mechanical switch used alone. The need for a control circuit 54 adds slightly to the expense of the combined switch but it is thought that the improved reliability will more than offset this slight added expense.

I claim:

1. An electronic switching circuit for controlling a supply of alternating current electricity to a load comprising: a bi-directional rectifier combination; a bridge rectifier circuit; two resistors each of which is connected between a separate one of the input terminals of the bridge rectifier circuit and a separate one of the main terminals of the bi-directional rectifier combination; at least one electrical connection from an input terminal of the bridge rectifier circuit to a trigger electrode of the bi-directional combination; a switchable semiconductor device having a control current path and a main current path which may be switched to a conductive state by drawing current through the control current path, the main current path being connected across the output terminals of the bridge rectifier circuit, and a control circuit means for controlling the current in the said control current path characterized in that the control circuit means comprises a transistor whose emitter-to-collector current path is connected in series with the said control current path of the switchable semiconductor device and whose base is connected to receive a full-wave rectified waveform from the bridge rectifier circuit; a source of direct current voltage; and, first control means for applying a direct current voltage from the said source to the emitter of the said transistor to cause the said transistor to become conductive whenever the said full-wave rectified waveform approaches zero voltage and then to maintain a continuous control current in the control current path of the switchable semiconductor device until the first control means is reset.

2. An electronic switching circuit as claimed in claim 1 and wherein the source of direct current voltage comprises a further rectifier circuit, and a resistor and a Zener diode connected in series across the output of the rectifier circuit, and the said first control means comprises means for applying the voltage developed across the Zener diode to the said transistor.

3. An electronic switching circuit as claimed in claim 2 and wherein the said first control means comprises an opto-electronic isolator.

4. An electronic switching circuit as claimed in claim 2 and wherein the further rectifier circuit is a voltage-multiplying circuit having input connections connected in parallel with the bi-directional rectifier combination.

5. An electronic switching circuit including an electro-mechanical switch connected in parallel with an electronic switching circuit as claimed in claim 1 and second control means connected to the electro-mechanical switch and to the electronic switching circuit for ensuring that the electronic switching circuit closes before the electro-mechanical switch closes and opens after the electro-mechanical switch opens.

6. An electronic switching circuit as claimed in claim 5 and wherein the said second control means comprises first delay means connected to the electro-mechanical switch and second delay means connected to the electronic switching circuit for providing corresponding first and second delays respectively said first and second delays being chosen such that the electronic switching circuit will not carry substantially more than half a cycle of the alternating current supply when closed before the electro-mechanical switch is closed and will not carry substantially more than half a cycle of the alternating current supply after the electro-mechanical switch has been opened.

* * * * *

UNITED STATES PATENT OFFICE
CERTIFICATE OF CORRECTION

PATENT NO. : 3,881,118

DATED : April 29, 1975

INVENTOR(S) : Robert Henry FORREST
John Kingston SPLATT

It is certified that error appears in the above-identified patent and that said Letters Patent are hereby corrected as shown below:

In the drawings, sheet 5, Figure 6, the output line from bistable circuit 63 should go to the electronic switching circuit 53 instead of to the electrical-mechanical switch 51, and switch 62 should be connected directly to the electrical-mechanical switch 51 instead of to the electronic switching circuit 53.

Column 4, line 29, the term "electro-magnetic" should read -- electro-mechanical --;

Column 4, line 51, the term "electro-magnetic" should read -- electro-mechanical --;

Column 5, line 36, the term "momostable" should read -- monostable --;

Column 5, line 57, the term "cauose" should read -- causes;

Column 8, line 32, the term "logig" should read -- logic --.

Signed and Sealed this tenth Day of February 1976

[SEAL]

Attest:

RUTH C. MASON
Attesting Officer

C. MARSHALL DANN
Commissioner of Patents and Trademarks